(12) United States Patent
Binder et al.

(10) Patent No.: US 9,314,912 B2
(45) Date of Patent: Apr. 19, 2016

(54) HAND-HELD POWER TOOL WITH A THREE-POINT MOUNTING

(75) Inventors: Albert Binder, Buchs (CH); Richard Clark, Sheffield (GB); Sarah Duggan, Sheffield (GB); Bernhard Sander, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 852 days.

(21) Appl. No.: 13/558,066

(22) Filed: Jul. 25, 2012

(65) Prior Publication Data

US 2013/0186664 A1    Jul. 25, 2013

(30) Foreign Application Priority Data

Jul. 26, 2011   (DE) .......................... 10 2011 079 828

(51) Int. Cl.
| | | |
|---|---|---|
| *B25D 11/06* | (2006.01) | |
| *H02K 33/16* | (2006.01) | |
| *B25D 17/28* | (2006.01) | |
| *H02K 41/03* | (2006.01) | |
| *H02K 7/08* | (2006.01) | |

(52) U.S. Cl.
CPC .............. *B25D 11/06* (2013.01); *B25D 11/064* (2013.01); *B25D 17/28* (2013.01); *H02K 33/16* (2013.01); *H02K 41/031* (2013.01); *B25D 2250/245* (2013.01); *H02K 7/08* (2013.01)

(58) Field of Classification Search
CPC .... B25D 11/06; B25D 11/064; B25D 11/008; B25D 13/00; B25D 17/24; B23D 51/16; H02K 5/16; H02K 33/16; H02K 41/02; H02P 25/06; F16F 15/03

USPC ........ 173/2, 114, 117, 201, 217, 171; 310/12, 310/12.14, 13, 114, 266, 90
See application file for complete search history.

(56) References Cited

U.S. PATENT DOCUMENTS

| | | | | |
|---|---|---|---|---|
| 5,142,172 | A * | 8/1992 | Horikoshi et al. | ............... 310/13 |
| 5,666,715 | A * | 9/1997 | Zoiss et al. | .................... 29/566.4 |
| 6,215,206 | B1 * | 4/2001 | Chitayat | .................... 310/12.14 |
| 6,520,269 | B2 * | 2/2003 | Geiger et al. | ................. 173/117 |
| 6,611,074 | B2 * | 8/2003 | Bartolotti | ....................... 310/114 |
| 6,763,789 | B1 * | 7/2004 | Liang et al. | ................ 123/90.11 |
| 6,849,970 | B2 * | 2/2005 | Watanabe | ................... 310/12.22 |
| 7,025,183 | B2 * | 4/2006 | Steffen et al. | ................. 188/267 |
| 7,812,500 | B1 * | 10/2010 | Ham | ............................. 310/266 |

(Continued)

FOREIGN PATENT DOCUMENTS

| | | |
|---|---|---|
| CH | 172 143 A | 9/1934 |
| DE | 1 756 300 U | 11/1957 |

(Continued)

OTHER PUBLICATIONS

German Search Report, dated Jun. 14, 2012, 6 pages.

(Continued)

*Primary Examiner* — Scott A. Smith
(74) *Attorney, Agent, or Firm* — Crowell & Moring LLP

(57) ABSTRACT

A hand-held power tool is disclosed. The power tool has a linear motor with a rotor, an exciter piston that is coupled mechanically to the rotor, and a bearing device with a rotor mounting to support the longitudinal movement of the rotor and an exciter piston mounting to support the exciter piston. The rotor mounting and the exciter piston mounting form a three-point mounting, which is the sole bearing for the rotor and the exciter piston.

13 Claims, 2 Drawing Sheets

(56) References Cited

U.S. PATENT DOCUMENTS

| | | | |
|---|---|---|---|
| 7,926,584 B2 * | 4/2011 | John et al. | 173/1 |
| 2008/0252150 A1 * | 10/2008 | Grundl et al. | 310/12 |
| 2009/0065226 A1 * | 3/2009 | John et al. | 173/6 |

FOREIGN PATENT DOCUMENTS

| | | |
|---|---|---|
| DE | 1 106 707 B | 5/1961 |
| DE | 1 109 109 B | 6/1961 |
| DE | 1 438 257 A | 10/1968 |
| DE | 35 29 483 C1 | 6/1989 |
| DE | 197 00 392 A1 | 7/1997 |
| DE | 101 56 388 A1 | 6/2003 |
| DE | 103 32 521 A1 | 2/2005 |
| DE | 10 2007 000 488 A1 | 3/2009 |
| EP | 2 036 680 A2 | 3/2009 |

OTHER PUBLICATIONS

German Search Report (w/English Translation), dated Jun. 14, 2012, 12 total pages.
European Search Report, dated Oct. 18, 2012, 7 pages.

* cited by examiner

HAND-HELD POWER TOOL WITH A THREE-POINT MOUNTING

This application claims the priority of German Patent Document No. DE 10 2011 079 828.5, filed Jul. 26, 2011, the disclosure of which is expressly incorporated by reference herein.

BACKGROUND AND SUMMARY OF THE INVENTION

The invention relates to a hand-held power tool, specifically a chiseling hand-held power tool.

A hand-held power tool with a striking mechanism that is pneumatically driven by a linear motor is known from Unexamined German Application DE 10 2007 000 488 A1. The linear motor has a stator and a rotor. The rotor is connected in a mechanically rigid manner to the exciter piston. The rotor of the linear motor is fork-shaped and has two rods, each of which is mounted flat directly in two air gaps of the rotor that are arranged consecutively along an axis of motion of the rotor. The two air gaps in the core of the stator are each made of two parallel partial air gaps, both of which are configured to be flat. The exciter piston is guided along an axis in a hollow cylinder of the striking mechanism. The two rods of the rotor are mounted flat directly in the two air gaps, i.e., on four partial air gaps against the stator. Accordingly, the previously known hand-held power tool has a bearing device, which has a rotor mounting in the form of four flat partial air gaps to support the longitudinal movement of the rotor and an exciter piston mounting in the form of a hollow cylinder to support the exciter piston. In the case of the previously known hand-held power tool, the rotor and the stator must be manufactured so that they are coordinated very precisely with each other, wherein particularly the adjustment of the mechanics, especially the air gaps, is relatively complex. In the event of adjustment defects or a user-induced maladjustment of the fit, there is an increased risk that a rotor will be guided into the air gaps in an unclean state or with increased resistance or even in a canted manner.

It is fundamentally desirable to ensure a mounting for the rotor that is as frictionless as possible but nevertheless secure, and that has reasonable manufacturing tolerances.

At this point, the invention comes into play; its object is to disclose a hand-held power tool with a simply designed and nevertheless reliable bearing device to support the rotor. In particular the bearing device is improved over the prior art and is simple to produce in terms of manufacturing.

The invention attains this object by a hand-held power tool of the type cited at the outset. An embodiment of the hand-held power tool according to the invention comprises:
 a linear motor with a rotor,
 an exciter piston rigidly coupled to the rotor in a mechanical manner, and
 a bearing device with a rotor mounting in order to support the longitudinal movement of the rotor and an exciter piston mounting in order to support the longitudinal movement of the exciter piston.

It is furthermore provided according to the invention that the rotor mounting have a first bearing and a second bearing, which support the rotor on opposing sides, wherein the rotor mounting enables a swiveling of the rotor together with the exciter piston around at least one axis lying transverse to the axis of motion, and the exciter piston mounting comprises a third bearing with a longitudinal guide along an axis of motion for the exciter piston.

The invention starts with the consideration that, in the case of the previously known hand-held power tool, the mounting for the rotor of the linear motor is already repeatedly over-determined, namely because of the four flat partial air gaps, the result of which is that a complex adjustment of these bearing locations is required. If this type of complex adjustment is supposed to be avoided, one possibility would be to have the manufacturing tolerances be very narrow, which would lead to a relatively expensive hand-held power tool. A further possibility would be putting up with incorrect positions of the rotor in the bearing device. However, the result in this case is a significant generation of heat caused by frictional forces, something that ultimately would have a negative impact on the service life. The invention starts from the idea that both approaches are disadvantageous.

The invention has recognized that a rotor mounting with a first bearing and a second bearing, which support the rotor on opposing sides, as well as an exciter piston mounting are fundamentally advantageous. A third bearing of the exciter piston mounting provides in this case for a longitudinal guide along an axis of motion for the exciter piston.

Such a bearing device system is not over-determined, since it is clearly defined through the three bearings. According to the concept of the invention, the assembly made of the exciter piston and rotor is accordingly viewed as a whole and a bearing device is provided which offers a statically determined, but not over-determined, mounting for the assembly made of the exciter piston and rotor. As part of an especially advantageous further development, the rotor mounting and the exciter piston mounting form a three-point mounting in an idealized manner with a first, second and third bearing.

In addition, the rotor mounting according to the invention allows a swiveling of the rotor together with the exciter piston around at least one axis lying transverse to the axis of motion. This also provides for a degree of freedom in the movement of the rotor, which may be advantageous for operational actuation as well as when assembling the rotor in the rotor mounting.

In particular the rotor's swiveling capability is limited in amplitude; a reliable and in the process not over-determined mounting of the rotor is therefore ensured. The first bearing part preferably contains the rotor laterally and on an upper and lower side of the rotor. As a result, the rotor is mounted especially securely. In particular, the rotor is mounted with play in order to permit longitudinal movement of the rotor with an adequately low resistance in the first and second bearings.

Additional advantageous further developments of the invention are disclosed in the dependent claims and indicate in detail advantageous possibilities of realizing the concept explained above within the framework of the stated problem as well as with respect to further advantages.

An especially advantageous further development of the invention assumes that a prior art rotor that is held and guided directly in the stator may be further improved in terms of its mounting. The invention starts with the consideration that it is advantageous to incorporate a longitudinally movable guide of the rotor on the one hand and a holder of the rotor separately on the motor or housing.

Consequently, the further development provides that the first and the second bearing each:
 have a first bearing part, which grips around the rotor, in particular laterally and on an upper and lower side, and
 have a second bearing part, in which the first bearing part is movable, preferably held with limited mobility, along at least one axis lying transverse to an axis of motion.

The rotor is guided in an advantageous manner by the first bearing part. The first bearing part guiding the rotor is held so that it has limited mobility along at least one axis lying transverse to the axis of motion in an advantageous manner by the second bearing part.

The bearing device is preferably positioned in the hand-held power tool to support the rotor in an axis of motion of a tool of the hand-held power tool.

Conceptually, the rotor mounting and the exciter piston mounting preferably form a three-point mounting. According to the concept of this further development, a three-point mounting is provided to support an assembly including a rotor and an exciter piston rigidly coupled therewith in a mechanical manner. In a departure from the prior art bearing device, according to the idea of the invention, a rotor mounting and an exciter piston mounting, which preferably form a three-point mounting, are provided to support the rotor. The three-point mounting especially advantageously forms the sole mounting for the rotor and the exciter piston.

The rotor mounting advantageously has a relatively very small bearing surface percentage or bearing line percentage as compared to the overall surface of the assembly. The exciter piston mounting advantageously has a relatively very small bearing surface percentage or bearing line percentage as compared to the overall surface of the assembly. Accordingly, the rotor mounting and exciter piston mounting for the assembly are able to be described at least approximately as a three-point mounting.

The invention has recognized that the cited disadvantages are produced due to an over-determined mounting for a rotor and are further intensified by an exciter piston that is mechanically coupled to the rotor. This can be attributed to the fact that the exciter piston also assumes guidance functions and as a result is able to initiate so-called constraining forces in bearing locations for the linear motor. Until now these types of constraining forces could only be avoided by very narrow manufacturing tolerances, i.e., by very precise adjustment of the bearing locations, or by elastic intermediate elements, such as a so-called pendulum support. However, this leads to a relatively expensive manufacturing method for the hand-held power tool.

The bearing device of the hand-held power tool uses the exciter piston as a guide in an especially advantageous manner. The assembly made of an exciter piston and rotor is then mounted at three points, wherein preferably two bearing points are provided for the rotor and one bearing point is itself realized by the exciter piston mounted in a hollow cylinder. Thus, the bearing device is statically determined in an especially preferred manner, but not over-determined. As a result, no unnecessary constraining forces and/or constraining moments occur during operation of the linear motor of the hand-held power tool and furthermore a complex adjustment is not required. In addition, the frictional forces are relatively low so that comparatively little heat is generated by the frictional forces during operation of the hand-held power tool, the result of which is a positive impact on the efficiency and service life of the hand-held power tool.

In the framework of an especially preferred further structural development, the bearing device with the rotor mounting and the exciter piston mounting form the three-point mounting as the sole mounting, specifically through two opposing bearing points for the rotor and one bearing point for the exciter piston. The exciter piston is able to be adjusted fully flush in a hollow cylinder of a pneumatic striking mechanism and to be guided in a movable manner in the hollow cylinder along a working axis through the hollow cylinder. The exciter piston drives an impacting piston that is also arranged in the hollow cylinder via a pneumatic spring. The exciter piston and the hollow cylinder form a further bearing point. The two bearing points for the rotor may be, for example, flat recesses in which the rotor engages.

The first and second bearings are configured especially preferably separate from a stator of the linear motor. The second bearing part is preferably held on the linear motor, e.g., fastened to the stator and/or to the housing.

In the case of an especially preferred further-developed variant, the rotor mounting has a spherical body fastened to a calotte to support the rotor. The spherical body is fastened in the hand-held power tool via at least one calotte. Due to the spherical shape, practically no moments are transmitted between the spherical body and the calotte, rather at the most forces. As a result, the rotor mounting is statically determined in an especially improved manner, but not over-determined. To fasten the spherical body, the calotte is mounted inside the housing of the hand-held power tool.

For example, the spherical body has a groove, in which the rotor is able to engage. This groove is preferably formed by a flat recess in the spherical body, which is preferably approximately parallel to a cross-sectional surface, preferably practically around an equatorial surface of the spherical body.

Therefore, forces and moments are transmitted between the rotor and the spherical body via this groove. The spherical body however transmits merely forces and not moments to the calotte, something that has a favorable effect on the overall mounting. The groove itself has a relatively very small bearing surface percentage or bearing line percentage as compared to the overall surface of the assembly.

When manufacturing the spherical body, a protrusion, for example in the form of a chip site or a sprue plug or an eject projection may develop. In a preferred further-developed variant, the calotte of the rotor mounting has a recess to contain such a protrusion of the spherical body. Such a recess may be realized by a through-bore or by a blind hole. The advantage of the cited recess is that the above-mentioned protrusion on the spherical body does not have to be laboriously removed, but ultimately, if applicable, may be left on the spherical body resulting in less laborious processing during the manufacturing process; in particular to be easily accommodated in the recess later when the calotte is attached.

In order to make a twisting or a tilting possible between the spherical body and the calotte, the recess is configured in the calotte, preferably in such a way that it is able to contain a larger volume than that of the protrusion.

According to a further preferred further-developed variant, the rotor mounting has a spring arrangement, in particular a disk spring, to pretension the calotte against the spherical body. The spring arrangement may be provided on one side. It therefore requires only a few parts for the spring arrangement, which reduces the wear and tear on parts as well as the complexity of the rotor mounting.

In the framework of a further development that has been improved even further especially with respect to reliability, a further calotte may be provided. This makes an especially secure fastening of the rotor possible. Two springs may be provided, which tension both calottes against the spherical body.

In the framework of another preferred further structural development, the rotor of the linear motor of the hand-held power tool is parallelepiped-shaped. In other words, the rotor preferably has a rectangular cross-section and a rectangular longitudinal section, as well as an overall flat structure. This parallelepiped-shaped rotor itself preferably engages in the groove of the spherical body.

The mechanical coupling between the rotor and the exciter piston is configured to be preferably rigid, for example through a rigid rod. In a preferred further-developed variant, the exciter piston mounting has a hollow cylinder, the hollow space of which is configured to support the exciter piston. In the process, moments between the exciter piston and the rod are not supported, because such an exciter piston mounting functions similar to a ball joint.

In particular the exciter piston is designed to be comparatively short in the axial direction and preferably has a barrel-shaped outer contour. A dimension of the exciter piston along a working axis of the pneumatic striking mechanism is, for example, less than 50% of the diameter of the exciter piston. In particular a dimension of the exciter piston along a working axis is substantially shorter than the rigid connection between the exciter piston and rotor.

For example, a cylinder jacket surface may be provided with a sealing ring arranged therein. In particular the sealing ring may be formed, for example, in the design of an O-ring. The sealing ring may expediently project from the jacket surface and be in contact with the inner surface of the hollow cylinder.

In a preferred further development, the rotor mounting has a first spherical body, which is fastened via first, in particular via two, calottes in the hand-held power tool, and a second spherical body, which is fastened via second, in particular via two, calottes in the hand-held power tool. These two spherical bodies are preferably arranged opposite from each other.

The first spherical body expediently has a first groove and the second spherical body has a second groove, wherein the rotor, which is preferably parallelepiped-shaped, engages in the first groove and in the second groove. Accordingly, the first groove and the second groove are preferably in a plane, which includes a rotor axis of motion.

The bearing device in the hand-held power tool is positioned especially preferably to support the rotor in an axis of motion of a tool, which is driven by the exciter piston via a mechanical transmission. This produces an especially compact structure for the hand-held power tool, with a high level of efficiency.

The hand-held power tool has, for example, an electro-pneumatic striking mechanism, which is driven by the rotor. For example, the hand-held power tool is a hammer drill or a chiseling hand-held power tool.

Exemplary embodiments of the invention will now be described in the following on the basis of drawings. These drawings are not necessarily supposed to represent the exemplary embodiments to scale; rather the drawings are executed in a schematic and/or slightly distorted form when this is useful for explanatory purposes. Reference is made to the pertinent prior art with respect to additions to the teachings directly identifiable from the drawings. It must be borne in mind in this case that a wide range of modifications and changes related to the form and detail of an embodiment may be undertaken without deviating from the general idea of the invention. The features of the invention disclosed in the description, the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

Additional advantages, features and details of the invention are disclosed in the following description of the preferred exemplary embodiments as well as on the basis of the drawings, which show the following in a schematic representation:

DETAILED DESCRIPTION OF THE DRAWINGS

Figure 1:
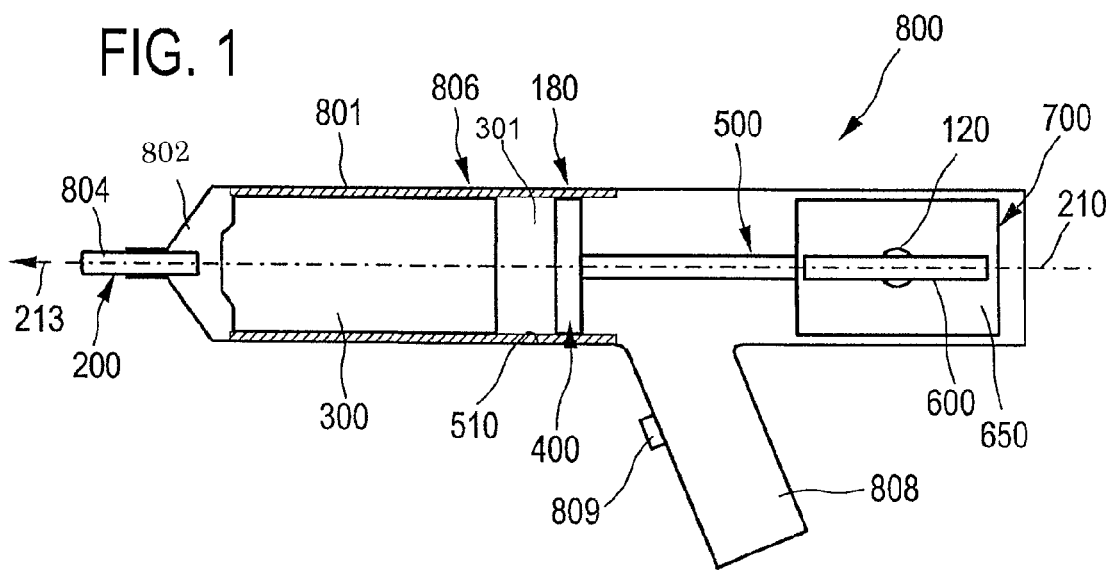
FIG. 1 illustrates an exemplary embodiment of a hand-held power tool with a linear motor with a rotor, an exciter piston, and a bearing device.

FIG. 1 schematically shows a chiseling hand-held power tool 800 as an example. The hand-held power tool 800 has a housing 801 with a tool receptacle 802, in which a shaft end of a tool 200, e.g., having a chisel 804, may be inserted. A linear motor 700, which drives a pneumatic striking mechanism 806, forms a primary drive of the hand-held power tool 800. An operator may guide the hand-held power tool 800 by a hand grip 808 and put it into operation by a system switch 809. During operation, the hand-held power tool 800 drives the chisel 804 continuously along an axis of motion 210 in the impact direction 213 into a substrate.

The striking mechanism 806 has an exciter, in this case in the form of an exciter piston 400, and a striking device, in this case in the form of an impacting piston 300, which are movably guided in a guide tube 510 of an exciter piston mounting 180 of the striking mechanism 806 along an axis of motion 210. The exciter piston 400 is coupled to the linear motor 700 via a mechanical coupling 500 in the form of a rod and forced into a periodic, linear movement. A pneumatic spring, formed by a pneumatic chamber 301, between the exciter and the striking device couples a movement of the striking device to the movement of the exciter. In the present case, the impacting piston 300 is able to strike directly on a rear end of the tool 200 or indirectly transmit a portion of its impulse via an essentially resting intermediate striking device to the chisel 804 in this case.

Figure 2:
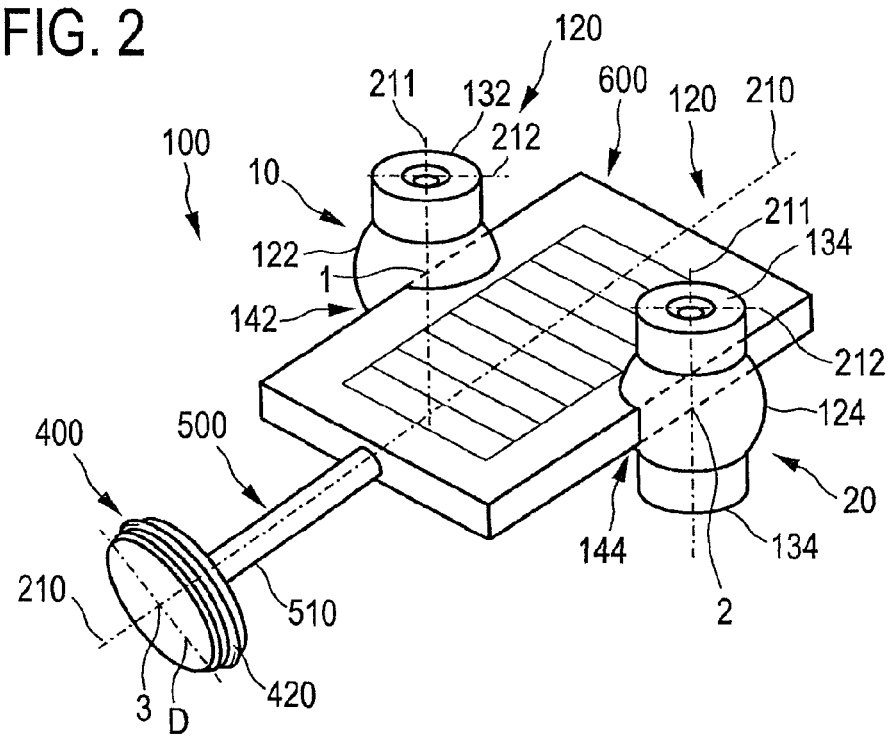
FIG. 2 illustrates an exemplary embodiment of a bearing device with a rotor mounting and an exciter piston mounting.

FIG. 2 shows a schematic representation of an exemplary embodiment of a bearing device 100 with a rotor mounting 120.

Figure 4:
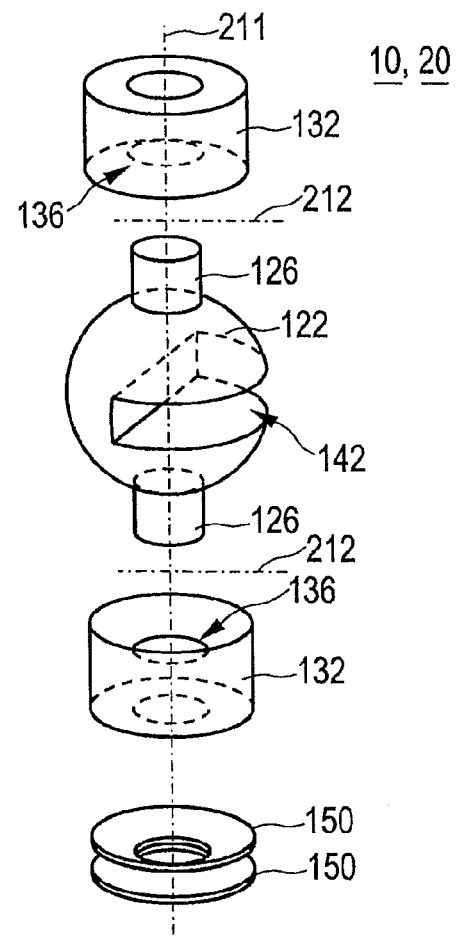
FIG. 4 illustrates an exemplary embodiment of the rotor mounting.

FIG. 4 shows a detailed exploded view of a first and second bearing 10, 20 of the rotor mounting 120 and reference will also be made to it.

Figure 3:
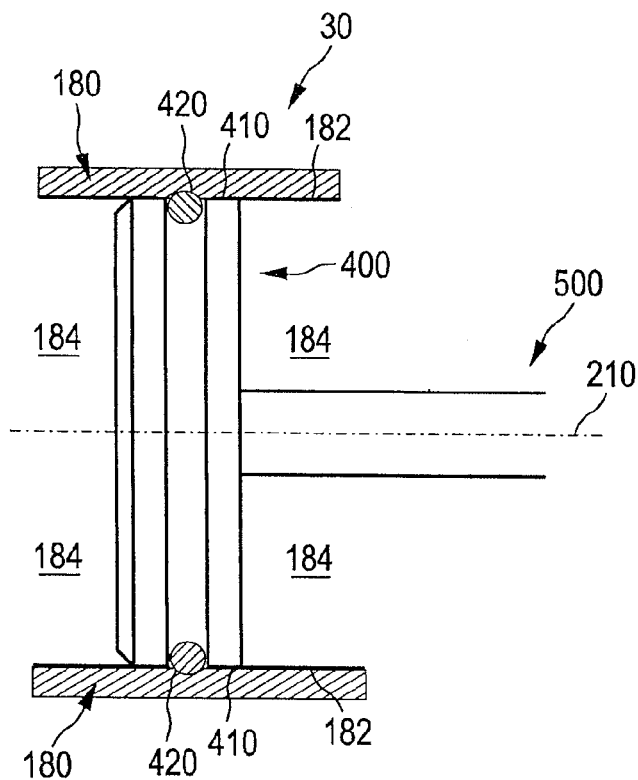
FIG. 3 illustrates an exemplary embodiment of the exciter piston mounting.

FIG. 3 depicts a detailed view of exciter piston mounting 180 that is a part of the bearing device 100.

To support a rotor 600 of a linear motor 700, according to the idea of the invention, the bearing device 100 is integrated into a hand-held power tool 800, for example in the type of exemplary embodiment shown schematically in FIG. 1. The rotor 600, the guide tube 510 and the exciter piston 400 are mounted in an axis of motion 210 along which a tool 200 of the hand-held power tool 800 is able to move.

The bearing device 100 according to FIG. 2 with its two-part rotor mounting 120, which has a first and second bearing 10, 20, and its exciter piston mounting 180, which has a third bearing 30, forms a determined, but not over-determined three-point mounting. The bearing device 100 thereby mounts the assembly made of an exciter piston 400 and rotor 600 connected via a mechanical coupling 500; in other words, the assembly made of an exciter piston 400 and rotor 600 is mounted as a whole; not for instance the exciter piston 400 and rotor 600 mounted separately from each other. The three idealized bearing points in the three-point mounting formed by the first, second and third bearings 10, 20, 30 will be explained in greater detail in the following. In doing so, reference will be made in particular to the details of FIG. 3 and FIG. 4.

The exciter piston 400 has a barrel-shaped outer contour and is mounted in an exciter piston mounting 180 with a guide tube in the form of a hollow cylinder 182. The exciter piston 400 is able to glide along the hollow space 184 of the hollow cylinder 182. For this purpose, the exciter piston has a cylinder jacket surface 410 with a sealing ring 420, for example an O-ring, arranged therein. The cylinder jacket surface 410 can be guided on an inner side of the hollow cylinder 182 in an air-tight manner mediated by the sealing ring 420.

The exciter piston 400 is mechanically coupled to the parallelepiped-shaped rotor 600 via a rod of the mechanical coupling 500 in the guide tube 510. The parallelepiped-shaped rotor 600 is guided into two first bearing parts, which are formed in the present case as two spherical bodies 122, 124. To this end, the rotor 600 lies in two grooves 142, 144 of the two spherical bodies 122, 124. In this respect, the spherical bodies 122, 124 form two of the three bearing points of the bearing device 100 in the region of their grooves 142, 144.

Each groove 142, 144 is expediently dimensioned in the spherical body 122, 124 in such a way that the surface pressure between the rotor 600 and the spherical body 122, 124 does not exceed a predefined maximum. As a result, the bearing device 100 of the hand-held power tool 800 is able to be dimensioned with respect to a predefined operating time. Consequently, the sizes of the surfaces in the grooves 142, 144 may turn out to be very different depending upon the forces between the rotor 600 and the rotor mounting. In the present case, the minimum diameter of the spherical body 122, 124 is co-determined by the surfaces of the grooves 142, 144 in the spherical body 122, 124. The dimensions of a calotte 132, 134 explained in the following are coordinated therewith.

When the spherical bodies 122, 124 are manufactured, protrusions 126 may develop, for example in the form of chip sites from a metal-cutting manufacturing or in the form of a sprue plug or an eject projection from an injection molding manufacturing method. For this reason, the two first calottes 132 have a recess 136, which contain these protrusions 126.

Each of the two first bearing parts is therefore held so that it has limited mobility in each two second bearing parts; in the present case namely limited mobility along at least a first axis 211 lying transverse to the axis of motion 210 and also along at least a second, different, axis 212 lying transverse to the axis of motion 210. In the present case, the axis of motion 210 and the transverse lying axes 211, 212 form a Cartesian coordinate system. In the case at hand, the two second bearing parts are fastened in the stator 650 of the linear motor 700 via two calottes 132, 134 respectively.

According to the structure of a rotor mounting 120 shown schematically in FIG. 4, the rotor 600 is guided so that it has longitudinal mobility in a center position of the spherical body 122 having the first groove 142 and a center position of the spherical body 124 having the second groove 144. In this respect, the idealized points of the three-point mounting correspond to the bearing points 1, 2, 3. In this case, a center of gravity of the exciter piston 400 is marked approximately by the third bearing point 3, in this case a point of intersection of the axis of motion 210 with a diameter D of the exciter piston 400 transverse to the axis of motion 210.

Because of the spherical shape, no moments are transmitted between the first spherical body 122 and the calottes 132, rather at the most forces. In order to obtain a pre-tensioning of the first calottes 132 against the first spherical body 122, disk springs 150 are provided in the case of the exemplary embodiment depicted in FIG. 4. In the case at hand, the disk springs 150 tension the first calottes 132 against the first spherical body 122 on one side (and on two sides in an embodiment not shown here). The first and second bearings 10, 20 are configured to be very similar here, or mirrored in the case at hand so that FIG. 4 applies to both.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-held power tool, comprising:
   a linear motor with a rotor;
   an exciter piston mechanically coupled to the rotor; and
   a bearing device with a rotor mounting, wherein a longitudinal movement of the rotor is supportable by the rotor mounting, and an exciter piston mounting, wherein a longitudinal movement of the exciter piston is supportable by the exciter piston mounting;
   wherein the rotor mounting has a first bearing and a second bearing, wherein the rotor is supported on opposing sides by the first bearing and the second bearing, and wherein the rotor mounting enables a swiveling of the rotor together with the exciter piston around an axis lying transverse to an axis of motion of a tool of the hand-held power tool;
   wherein the exciter piston mounting has a third bearing with a longitudinal guide along the axis of motion;
   and wherein the first bearing and the second bearing each include a first bearing part and a second bearing part, wherein the first bearing part is a spherical body and the second bearing part is a calotte, and wherein the first bearing part engages the second bearing part such that the first bearing part has limited mobility.

2. The hand-held power tool according to claim 1, wherein the first bearing and the second bearing each include a spring, and wherein the spring presses the calotte against the spherical body.

3. A hand-held power tool, comprising:
   a linear motor with a rotor;
   an exciter piston mechanically coupled to the rotor; and
   a bearing device with a rotor mounting, wherein a longitudinal movement of the rotor is supportable by the rotor mounting, and an exciter piston mounting, wherein a longitudinal movement of the exciter piston is supportable by the exciter piston mounting;
   wherein the rotor mounting has a first bearing and a second bearing, wherein the rotor is supported on opposing sides by the first bearing and the second bearing, and wherein the rotor mounting enables a swiveling of the rotor together with the exciter piston around an axis lying transverse to an axis of motion of a tool of the hand-held power tool;
   wherein the exciter piston mounting has a third bearing with a longitudinal guide along the axis of motion;

and wherein the first bearing and the second bearing each include a spherical body, wherein the respective spherical bodies have a groove, and wherein the rotor engages in the respective grooves.

4. The hand-held power tool according to claim 3, wherein the first bearing and the second bearing are separate components from a stator of the linear motor.

5. The hand-held power tool according to claim 3, wherein the rotor mounting and the exciter piston mounting mount the rotor and the exciter piston at three mounting points via the first bearing, the second bearing, and the third bearing.

6. The hand-held power tool according to claim 3, wherein the rotor and the exciter piston are supported solely by the first bearing, the second bearing, and the third bearing.

7. The hand-held power tool according to claim 3, wherein two opposing bearing points of a three-point mounting are provided by the first bearing and the second bearing for the rotor, and a third bearing point of the three-point mounting is provided by the third bearing for the exciter piston.

8. The hand-held power tool according to claim 3, wherein the third bearing has a hollow cylinder aligned along the axis of motion, wherein the exciter piston is supportable in the hollow space for longitudinal movement, and wherein a cylinder jacket surface of the exciter piston is guidable in an air-tight manner on an inner side of the hollow cylinder.

9. The hand-held power tool according to claim 8, wherein a sealing ring is disposed in the cylinder jacket surface.

10. A hand-held power tool, comprising:
a linear motor with a rotor;
an exciter piston mechanically coupled to the rotor: and
a bearing device with a rotor mounting, wherein a longitudinal movement of the rotor is supportable by the rotor mounting, and an exciter piston mounting, wherein a longitudinal movement of the exciter piston is supportable by the exciter piston mounting;
wherein the rotor mounting has a first bearing and a second bearing, wherein the rotor is supported on opposing sides by the first bearing and the second bearing, and wherein the rotor mounting enables a swiveling of the rotor together with the exciter piston around an axis lying transverse to an axis of motion of a tool of the hand-held power tool;
wherein the exciter piston mounting has a third bearing with a longitudinal guide along the axis of motion;
and wherein the first bearing and the second bearing each include a calotte, wherein the respective calottes each have a recess, and wherein a protrusion of the first bearing and a protrusion of the second bearing are disposed within the respective recesses.

11. The hand-held power tool according to claim 10, wherein the recesses are larger than the protrusions.

12. A hand-held power tool, comprising:
a linear motor with a rotor;
an exciter piston mechanically coupled to the rotor; and
a bearing device with a rotor mounting, wherein a longitudinal movement of the rotor is supportable by the rotor mounting, and an exciter piston mounting, wherein a longitudinal movement of the exciter piston is supportable by the exciter piston mounting;
wherein the rotor mounting has a first bearing and a second bearing, wherein the rotor is supported on opposing sides by the first bearing and the second bearing, and wherein the rotor mounting enables a swiveling of the rotor together with the exciter piston around an axis lying transverse to an axis of motion of a tool of the hand-held power tool;
wherein the exciter piston mounting has a third bearing with a longitudinal guide along the axis of motion;
and wherein the first bearing and the second bearing each include a spherical body, a first calotte, and a second calotte, wherein the first calotte and the second calotte are disposed on opposing ends of the respective first bearing and the second bearing.

13. The hand-held power tool according to claim 12, wherein the respective spherical bodies have a groove and wherein the rotor engages in the grooves.

* * * * *